United States Patent Office 3,703,533
Patented Nov. 21, 1972

3,703,533
PROCESS FOR THE MANUFACTURE OF
1,4-DIHALOGENANTHRAQUINONES
Maurice Grelat, Bettingen, Switzerland, assignor to Ciba-Geigy AG, Basel, Switzerland
No Drawing. Continuation-in-part of application Ser. No. 724,615, Apr. 26, 1968. This application May 25, 1971, Ser. No. 146,851
Claims priority, application Switzerland, June 12, 1967, 8,268/67
Int. Cl. C09b 1/00
U.S. Cl. 260—384
10 Claims

ABSTRACT OF THE DISCLOSURE

A process for the manufacture of 1,4-dihalogenanthraquinones, wherein leucoquinizarine is treated in a first stage with a halogenating agent until six halogen atoms have been absorbed into the molecule, and the hexahalogeno derivative thus obtained is hydrolyzed in a second stage.

CROSS-REFERENCE TO RELATED APPLICATION

This application is a continuation-in-part of application Ser. No. 724,615, filed Apr. 26, 1968, now abandoned.

The present invention provides a process for the manufacture of 1,4-dihalogenanthraquinones, especially 1,4-dichloroanthraquinones.

The invention is based on the observation that when leucoquinizarine is treated with a strong halogenating agent and the resulting intermediate product is hydrolysed a good yield of 1,4-dihalogenanthraquinone is obtained.

Accordingly, the present invention provides a process for the manufacture of 1,4-dihalogenanthraquinones, especially 1,4-dichloranthraquinone, wherein leucoquinizarine is treated in a first stage with a halogenating agent until six halogen atoms have been absorbed into the molecule and the hexahalogeno derivative thus formed is hydrolysed in a second stage..

Suitable halogenating agents are, for example, phosphorus tribromide, phosphorus pentabromide, fluorosulphonic acid, a bromine/dioxane complex, bromine (preferably in the presence of phosphorus tribromide), or preferably chlorine, sulphur dichloride or above all phosphorus pentachloride or phosphorus trichloride in combination with chlorine.

Chlorinating agents which are capable of introducing further substituents into the anthracene ring at the same time for example chlorosulphonic acid, must of course not be used.

The chlorination may be carried out with simultaneous irradiation with gamma rays or actinic light.

The halides of iron, aluminium, antimony or molybdenum, iodine or sulphur may be additionally used to accelerate the halogenating reaction.

The reaction in the first stage may be carried out under the reaction conditions in solvents that are inert towards halogens, for example high-boiling point chlorinated hydrocarbon especially tetrachloroethane, hexachloroethane, ortho-dichlorobenzene, nitrobenzene or carbon disulphide, or in the usual solvents, for example glacial acetic acid.

Alternatively liquid inorganic solvents, especially phosphorus oxychloride and sulphuric acid, may be used if desired.

The hexahalogeno derivative resulting from the halogenation in the first stage contains four relatively labile halogen atoms which are easy to eliminate selectively with a wide variety of reagents.

This is preferably carried out in solvolyzing media for example alcohols, especially alcohols containing at least 3 carbon atoms for example propanol, isopropanol, amyl alcohol or the like, or with the use of low-boiling point alcohols under superatmospheric pressure. Acid media especially concentrated sulphuric acid may also be used. Oxidants, for example chromic acid, are likewise suitable. The hydrolysis may also be carried out in an alkaline medium provided it is ensured that the halogen atoms in the 1,4-position are not split off.

After the hydrolysis the reaction mixture is worked up in the usual manner and the 1,4-dihalogenanthraquinone isolated.

Using as an example the formation of 1,4-dichloroanthraquinone, which is a preferred object of the present invention, the reaction occurring according to the process of this invention may be represented as follows:

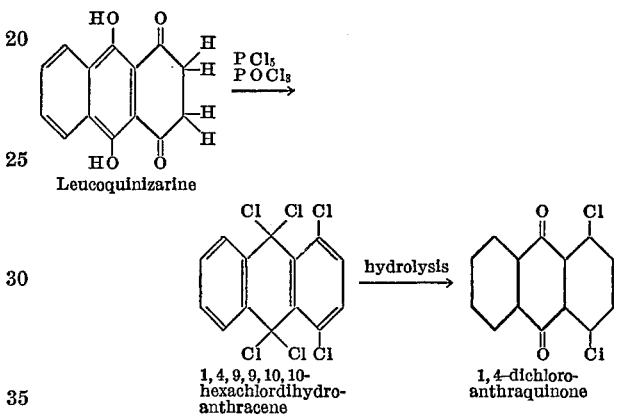

Although a process for the manufacture of 1,4,9,9,10,10-hexachlorodihydroanthracene has already been described, the authors [Barnett, Matthews and Wiltshire, Recueil trav. chim. des Pays Bas, volume 45, page 563 (1926)] started from quinizarine and the yield they obtained was so poor that they abandoned the process. On the other hand, a satisfactory yield is surprisingly obtained by starting from leucoquinizarine.

The 1,4-dihalogenanthraquinones are valuable intermediates for the manufacture of dyestuffs.

Unless otherwise indicated, parts and percentages in the following examples are by weight.

Example 1

24.2 parts of leucoquinizarine are added to 150 parts of phosphorus pentachloride in 50 parts of phosphorus oxychloride. The reaction mixture is slowly heated to 105 to 110° C., stirred for 20 hours at the boil and then allowed to cool. The product which has crystallized out is filtered and then washed on a suction filter with 30 ml. of petroleum ether. It is distributed over 300 parts of ice, filtered, washed with water until the washings run neutral and dried. A good yield of 1,4,9,9,10,10-hexachloro-9,10-dihydroanthracene which decomposes at 260 to 270° C. is obtained.

Calculated (percent): C, 43.46; H, 1.56; Cl, 54.98. Found (percent): C, 43.62; H, 1.69; Cl, 54.92.

10 parts of the hexachlorodihydroanthracene described in the first paragraph are added at 80° C. to 50 parts of 96% sulphuric acid. The batch is stirred at 70 to 80° C. until a clear yellow solution has formed which is poured over 300 parts of ice. The precipitated product is filtered, washed with water until the washings run neutral and dried.

A quantitative yield of 1,4-dichloroanthraquinone, melting at 187 to 188° C., is obtained.

Example 2

24.2 parts of leucoquinizarine are added to 125 parts of phosphorus pentachloride in 100 parts of ortho-dichlorobenzene and the whole is slowly heated to 140 to 145° C. It is stirred for 18 hours at this temperature and the phosphorus oxychloride formed is continuously distilled off. On cooling, the crystalline precipitate is filtered, washed with small portions of methanol (total 100 ml.) and dried, to give a good yield of 1,4,9,9,10,10-hexachloro-9,10-dihydroanthracene.

10 parts of the hexachlorodihydroanthracene thus obtained are refluxed for 2½ hours in 100 parts of n-amyl alcohol. On cooling, a very good yield of crystalline 1,4-dichloroanthraquinone is obtained.

Example 3

24.2 parts of leucoquinizarine are added to 125 parts of phosphorus pentachloride in 100 parts of tetrachloroethane. The temperature is raised to 135° C. within 2 hours and the batch is stirred for 18 hours at this temperature. After cooling, the reaction mixture is diluted dropwise with 50 parts of methanol, and the precipitated product is filtered, washed with methanol and dried.

The resulting hexachlorodihydroanthracene, which is obtained in a good yield, is converted into 1,4-dichloroanthraquinone as described in Example 2.

Example 4

Compartive Test using leucoquinizarine and quinizarine as starting material.

(a) The procedure of Barnett et al. Rec. Trav. Chim. Pays Bas 1, vol. 45, page 563, 1926 was exactly repeated.

For this purpose 8.5 grams of dry quinizarine was suspended in 60 cc. of dry nitrobenzene and 10 grams of phosphorus pentachloride added. The whole was then slowly heated and finally boiled for 30 minutes. On cooling a small amount of 1:4-dichloroanthraquinone tetrachloride separated which was weighed without recrystallization.

The yield obtained was 0.27 grams (2% of theory).

(b) The above Example No. 3 was also exactly repeated as follows:

24.2 parts of leucoquinizarine was added to 125 parts of phosphorus pentachloride in 100 parts of tetrachloroethane. The temperature was raised to 135° C. within 2 hours and the batch was stirred for 18 hours at this temperature. After cooling, the reaction mixture was diluted dropwise with 50 parts of methanol, and the precipitated product was filtered, wash with methanol and dried.

The resulting hexachlorodihydroanthracene had a weight of 27.9 grams (72% of theory).

(c) The procedure of the above Example 3 was exactly repeated, however, instead of 24.2 parts leucoquinizarine 24.2 parts quinizarine was used as a starting material. Upon dilution with methanol a white powder was obtained. From this powder, 1,4,9,9,10,10-hexachlorodihydroanthraquinone could not be isolated, neither by crystallisation nor by column chromatography. The bulk of the white powder consisted of a single compound which was instable at room temperature and decomposed slowly to give gaseous hydrogen chloride. Treatment of this compound with sulfuric acid exactly as described in the second half of the above Example 1 gave a yellow stable, crystalline trichloro compound of unknown nature. Further treatment in sulfuric acid did not change that compound.

Analysis data (trichlorocompound).—Theoretical (percent): C, 53.97; H, 1.62; Cl, 34.14. Found (percent): C, 53.99; H, 1.65; Cl, 34.04. Molecular weight 311.50 (theoretical), 311.57 (found).

I claim:

1. A process for the manufacture of 1,4-dichloroanthraquinone, wherein leucoquinizarine is treated with heating in a first stage with molecular chlorine or an agent that yields molecular chlorine in situ, until six chlorine atoms have been absorbed into the molecule, and the hexachloro derivative thus obtained is hydrolyzed in a second stage.

2. A process as claimed in claim 1, wherein sulfur dichloride or phosphorus pentachloride or phosphorus trichloride in combination with chlorine is used as chlorinating agent.

3. A process as claimed in claim 1, wherein the halogenation is carried out in the presence of a phosphorus chloride.

4. A process as claimed in claim 2, wherein the first stage is carried out in an organic solvent that is inert towards halogens.

5. A process as claimed in claim 1, wherein the second stage is carried out in an alcohol as solvolyzing medium.

6. A process as claim in claim 5, wherein an alcahol containing at least three carbon atoms in the molecule is used.

7. A process as claimed in claim 1, wherein the second stage is carried out in the presence of a strong acid.

8. A process as claimed in claim 7 wherein concentrated sulfuric acid is used.

9. A process as claimed in claim 1, wherein the second stage is carried out in the presence of an acid oxidant.

10. A process as claimed in claim 9 wherein chromic acid is used.

References Cited

FOREIGN PATENTS 290,879  3/1916  Germany _____ 260—384

LORRAINE A. WEINBERGER, Primary Examiner

R. GERSTL, Assistant Examiner

U.S. Cl. X.R.

260—649 R